United States Patent
Baker et al.

(10) Patent No.: US 10,361,868 B1
(45) Date of Patent: Jul. 23, 2019

(54) CRYPTOGRAPHIC CONTENT-BASED BREAK-GLASS SCHEME FOR DEBUG OF TRUSTED-EXECUTION ENVIRONMENTS IN REMOTE SYSTEMS

(71) Applicant: Google Inc., Mountain View, CA (US)

(72) Inventors: Brandon S. Baker, Redmont, WA (US); Uday Savagaonkar, Redmont, WA (US)

(73) Assignee: Google LLC, Mountain View, CA (US)

( * ) Notice: Subject to any disclaimer, the term of this patent is extended or adjusted under 35 U.S.C. 154(b) by 216 days.

(21) Appl. No.: 15/161,775

(22) Filed: May 23, 2016

(51) Int. Cl.
*H04L 9/32* (2006.01)
*H04L 9/06* (2006.01)
*H04L 9/30* (2006.01)
*G06F 11/36* (2006.01)
*G06F 21/62* (2013.01)

(52) U.S. Cl.
CPC ........ *H04L 9/3247* (2013.01); *G06F 11/3664* (2013.01); *H04L 9/0643* (2013.01); *H04L 9/30* (2013.01); *G06F 21/6245* (2013.01)

(58) Field of Classification Search
CPC .... G06F 21/41; G06F 21/6245; G06F 19/321; H04L 9/3228; H04L 63/0407
USPC ........................................................ 713/176
See application file for complete search history.

(56) References Cited

U.S. PATENT DOCUMENTS

| | | | |
|---|---|---|---|
| 7,587,558 B1 | 9/2009 | Smith et al. | |
| 7,720,864 B1 * | 5/2010 | Muth | G06F 17/30171 |
| | | | 707/707 |
| 8,104,076 B1 * | 1/2012 | Lam | G06F 21/6209 |
| | | | 713/182 |
| 8,321,682 B1 * | 11/2012 | Read | H04L 9/3228 |
| | | | 380/44 |
| 8,863,298 B2 | 10/2014 | Akella et al. | |
| 2006/0229911 A1 * | 10/2006 | Gropper | G06F 19/321 |
| | | | 705/2 |
| 2010/0058054 A1 * | 3/2010 | Irvine | H04L 63/0407 |
| | | | 713/165 |
| 2014/0100875 A1 * | 4/2014 | Davis | G06F 19/00 |
| | | | 705/3 |
| 2015/0213195 A1 * | 7/2015 | Blechman | G06F 19/322 |
| | | | 705/51 |
| 2016/0012242 A1 * | 1/2016 | Brucker | G06F 21/41 |
| | | | 726/1 |
| 2016/0117448 A1 * | 4/2016 | Van De Craen | G06F 21/6245 |
| | | | 705/3 |

* cited by examiner

*Primary Examiner* — Bryan F Wright
(74) *Attorney, Agent, or Firm* — Honigman Miller Schwartz and Cohn LLP (57) ABSTRACT

A method includes receiving a break-glass ticket scope identifying one or more secure containers of a secure container system. The secure containers are instantiated in a non-debuggable state and execute corresponding secure execution environments for contents of the corresponding secure containers. The method also includes generating a pending break-glass ticket having the break-glass ticket scope and transmitting the pending break-glass ticket to a break-glass approver for approver. In response to receiving an approved break-glass ticket from the break-glass approver, the method includes altering an access setting of the one or more secure containers defined in the break-glass ticket scope. The altered access setting allows debugging of the respective contents of the one or more secure containers executing the corresponding secure execution environments.

30 Claims, 9 Drawing Sheets

CRYPTOGRAPHIC CONTENT-BASED BREAK-GLASS SCHEME FOR DEBUG OF TRUSTED-EXECUTION ENVIRONMENTS IN REMOTE SYSTEMS

TECHNICAL FIELD

This disclosure relates to a break-glass scheme for debugging cryptographic content within trusted-execution environments in remote systems.

BACKGROUND

Secure container technologies offer prospects of rapidly scaling applications and services without incurring the large overhead associated with traditional virtualization environments. Customers may secure their data by deploying secure containers within a cloud environment that prevent even an administrator of the cloud environment from accessing the data within the secure containers. While concerns of data security can be addressed through the use of the secure containers, the administrator of the cloud environment usually incurs visibility challenges when debug availability issues must be addressed, or to verify that the customer is not abusing the service. To permit the administrator of the cloud environment access to the data within the containers, it is known to declare the containers a priori to be debuggable containers so that the administrator can attach a debugger to an instance of the secured containers at any time. While declaring the containers as debuggable allows the administrator to debug instances within the container, the customer must declare all instances of the containers as debuggable, since the customer does not know which instances the administrator wants to debug. As a result of declaring all instances of the containers as debuggable, the administrator may access any instance within the containers without approval from the customer, thereby negating any value of security associated with the secure containers.

SUMMARY

One aspect of the disclosure provides a method for executing a cryptographic consent based break glass scheme. The method includes receiving, at data processing hardware of a secure container system having secure containers, a break-glass ticket scope that identifies one or more secure containers of the secure container system. The secure containers are instantiated in a non-debuggable state and execute corresponding secure execution environments for contents of the corresponding secure containers. The method further includes generating, at the data processing hardware, a pending break-glass ticket having the break-glass ticket scope and transmitting the pending break-glass ticket from the data processing hardware to a break-glass approver for approval. The method includes receiving, at the data processing hardware, an approved break-glass ticket from the break-glass approver and, in response to receiving the approved break-glass ticket, altering, by the data processing hardware, an access setting of the one or more secure containers defined in the break-glass ticket scope. The altered access setting allows debugging of the respective contents of the one or more secure containers executing the corresponding secure execution environments.

Implementations of the disclosure may include one or more of the following optional features. In some implementations, the approved break-glass ticket includes a digital signature. In response to receiving the approved break-glass ticket, the method includes verifying, by the data processing hardware, the digital signature, and verifying, by the data processing hardware, the break-glass ticket scope as covering actual one or more secure containers of the secure container system.

In some examples, the access setting includes a performance profiling setting. Altering the access setting of the one or more secure containers defined in the break-glass ticket scope may include altering a cryptographic identity of the one or more secure containers defined in the break-glass ticket scope. Moreover, altering the access setting of the one or more secure containers defined in the break-glass ticket scope may provide access to a debugging application programming interface within the one or more secure containers. Access to the debugging application programming interface may be disabled, however, until the approved break-glass ticket is verified.

In some implementations, only the data processing hardware can execute the debugging of the respective contents of the one or more secure containers. The contents of the identified one or more secure containers may be collectively associated with execution of a software application. The approved break-glass ticket may include a cryptographic key or an identifier of the cryptographic key for accessing one or more of the identified one or more secure containers. In response to receiving the approved break-glass ticket, the method may include verifying, by the data processing hardware, the cryptographic key by comparing the cryptographic key with the identifier of the cryptographic key. The identifier of the cryptographic key includes a hash of the cryptographic key.

In some examples, the approved break-glass ticket is valid for a predetermined time period. In response to receiving the approved break-glass ticket, the method may include rejecting, by the data processing hardware, the approved break-glass ticket when a current time is outside the predetermined time period. The pending break-glass ticket may include one or more unique identifiers each identifying a corresponding one of the one or more secure containers defined the break-glass ticket scope.

Another aspect of the disclosure provides a system for operating a cryptographic consent based break glass scheme. The system includes data processing hardware of a secure container system having secure containers, and memory hardware in communication with the data processing hardware. The memory hardware stores instructions that when executed on the data processing hardware cause the data processing hardware to perform operations. The operations include receiving a break-glass ticket scope identifying one or more secure containers of the secure container system. The secure containers are instantiated in a non-debuggable state and execute corresponding secure execution environments for contents of the corresponding secure containers. The operations also include generating a pending break-glass ticket having the break-glass ticket scope and transmitting the pending break-glass ticket to a break-glass approver for approval. The operations include receiving an approved break-glass ticket from the break-glass approver and, in response to receiving the approved break-glass ticket, altering an access setting of the one or more secure containers defined in the break-glass ticket scope. The altered access setting allowing debugging of the respective contents of the one or more secure containers executing the corresponding secure execution environments.

This aspect may include one or more of the following optional features. In some implementations, the approved break-glass ticket includes a digital signature. The operations may also include, in response to receiving the approved break-glass ticket, verifying the digital signature and verifying the break-glass ticket scope as covering actual one or more secure containers of the secure container system. In some examples, the access setting includes a debug setting. The access setting may also include a performance profiling setting.

In some examples, altering the access setting of the one or more secure containers defined in the break-glass ticket scope includes altering a cryptographic identity of the one or more secure containers defined in the break-glass ticket scope. Moreover, altering the access setting of the one or more secure containers defined in the break-glass ticket scope may also provide access to a debugging application programming interface within the one or more secure containers. Access to the debugging application programming interface may be disabled, however, until the approved break-glass ticket is verified.

In some implementations, the data processing hardware can execute the debugging of the respective contents of the one or more secure containers. The contents of the identified one or more secure containers may be collectively associated with execution of a software application. In some examples, the approved break-glass ticket includes a cryptographic key or an identifier of the cryptographic key for accessing the one or more of the identified one or more secure containers. In some examples, the operations further include, in response to receiving the approved break-glass ticket, verifying the cryptographic key by comparing the cryptographic key with the identifier of the cryptographic key. The identifier of the cryptographic key may include a hash of the cryptographic key.

The approved break-glass ticket may be valid for a predetermined time period. The operations may also include, in response to receiving the approved break-glass ticket, rejecting the approved break-glass ticket when a current time is outside the predetermined time period. The pending break-glass ticket may include one or more unique identifiers each identifying a corresponding one of the one or more secure containers defined the break-glass ticket scope.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
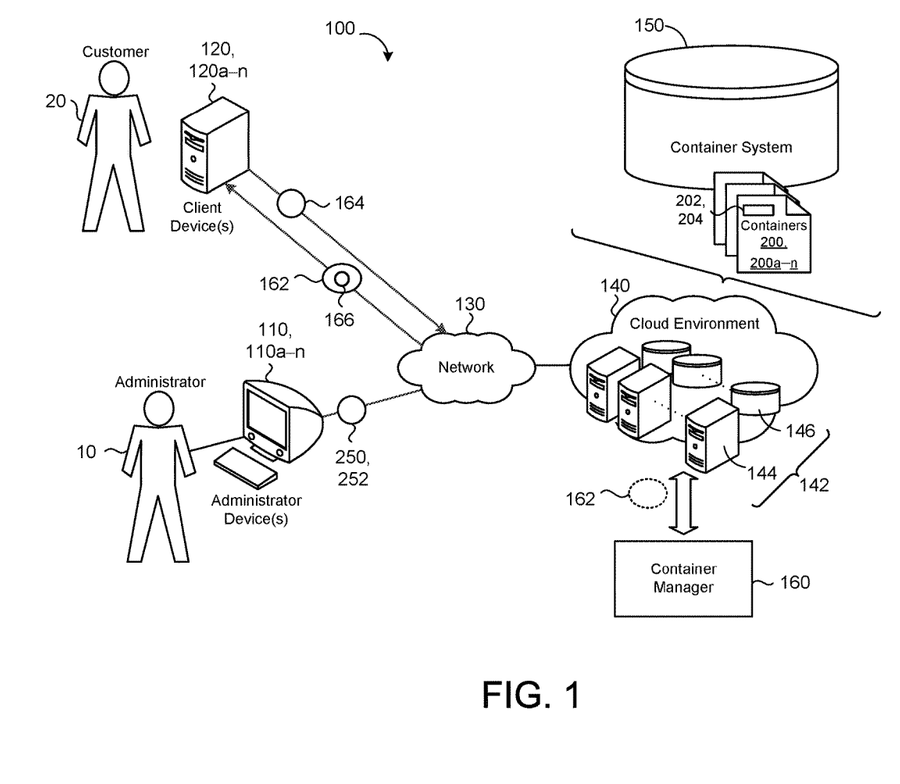
FIG. 1 is a schematic view of an example system for generating a break-glass ticket for altering an access setting of one or more secure containers.

Referring to FIG. 1, in some implementations, a system 100 includes one or more administrator devices 110a-n associated with a user 10, who may communicate, via a network 130, with a remote system 140. The system 100 may further include one or more client devices 120a-n associated with a customer 20 or client(s), who communicate, via the network 130, with the remote system 140. The remote system 140 may be a distributed system (e.g., cloud environment) having scalable/elastic resources 142. The resources 142 include computing resources 144 and/or storage resources 146. In some implementations, the remote system 140 executes a secure container system 150 having one or more secure containers 200, 200a-n within memory hardware. The remote system 140 also executes a container manager 160 for managing access to the secure containers 200 of the secure container system 150.

The administrator devices 110 and the client devices 120 can be any computing devices that are capable of communicating with the container manager 160 through the network 130. The administrator and client devices 110, 120, respectively, include, but are not limited to, desktop computing devices and mobile computing devices, such as laptops, tablets, smart phones, and wearable computing devices (e.g., headsets and/or watches). The administrator devices 110 may correspond to an administrator 10 or operator of the remote system 140 and the client devices 120 may correspond to customers 20 of the remote system 140 that deploy and/or access software applications 204 executing on the remote system 140.

In some implementations, each secure container 200 of the secure container system 150 executes a corresponding secure execution environment for contents 202 of the corresponding secure container 200. In some examples, the contents 202 of one or more secure containers 200 are collectively associated with a software application 204 executing on the remote system 140. As used herein, the content 202 may refer to code and/or data associated with execution of the software application 204 that the corresponding secure container 200 protects from disclosure or modification during execution of the software application 204. Accordingly, not even the administrator device 110 is able to freely inspect (e.g., debug) the contents 202 of the one or more secure containers 200 without approval expressly granted from a customer 20 that owns the contents 202 associated with the software application 204.

In some examples, the container manager 160 instantiates the secure containers 200 of the secure container system 150 in a non-debuggable state that prevents the administrator device 110 from freely inspecting (e.g., debugging) the contents 202 of the one or more secure containers 200 without approval expressly granted from the customer 20 that owns the contents 202 protected by the secure containers 200. However, in scenarios when the administrator 10 needs to inspect the contents 202 executing on the remote system 140, the customer 20 may approve a request from the administrator device 110 to the container manager 160 to allow the administrator device 110 to debug the respective contents 202 of one or more secure containers 200 executing the corresponding secure execution environments. In some implementations, the container manager 160 receives a break-glass ticket request 250 from the administrator device 110 to generate a pending break-glass ticket 162 for approval by the customer 20. The break-glass ticket request 250 includes a break-glass ticket scope 252 that identifies one or more secure containers 200 of the secure container system 150 to allow debugging of the respective contents 202 of the one or more secure containers 200 defined by the break-glass ticket scope 252. The container manager 160 generates the pending break-glass ticket 162 having the break-glass ticket scope 252 and transmits the pending break-glass ticket 162 to a client device 120 associated with a break-glass approver 310 (FIGS. 3A-4B) for approval. In response to receiving an approved break-glass ticket 164 from the client device 120, the container manager 160 alters an access setting 230 (FIG. 2) of the one or more secure containers 200 defined by the break-glass ticket scope 252 to allow the administrator device 110 to debug the respective contents 202 of the one or more secure containers 200 executing the corresponding secure execution environments.

Without the client device 120 (e.g., break-glass approver 310) approving the break-glass ticket 164 and the container manager 160 verifying the approved break-glass ticket 164, the administrator device 110 is unable to debug, or otherwise inspect, the contents 202 of the secure containers 200. In some scenarios, the container manager 160 transmits a notification 166 to the client device 120 that owns the content 202 protected by a secure container 200 when the administrator device 110 or another client device 120 attempts to inspect the content 202 while the corresponding secure container 200 is in the non-debuggable state.

Figure 2:
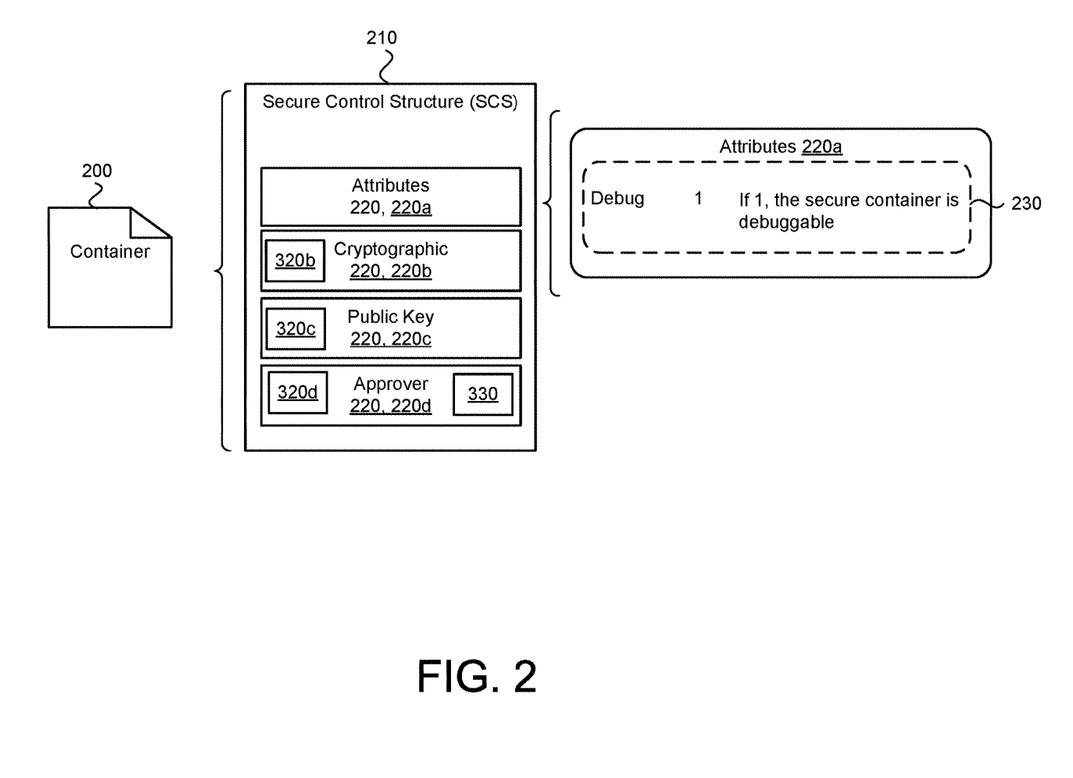
FIG. 2 is a schematic view of a secure control structure of an example secure container.

Referring to FIG. 2, in some implementations, each secure container 200 has a dedicated security control structure (SCS) 210 associated with a trusted execution environment. The SCS 210 has a plurality of fields 220, 220a-n, each containing information related to at least security settings and an identity of the corresponding secure container 200. In some examples, the SCS 210 includes at least an attributes field 220a, a cryptographic field 220b, a public key field 220c, and an approver field 220d. The attributes field 220a may contain the security settings of the corresponding secure container 200. In some examples, the attributes field 220a contains the access setting 230 associated with the secure container 200 when the secure container 200 is instantiated. The access setting 230 may include a debug setting. For instance, the access setting 230 may include a bit referred to as "Debug" that indicates whether or not the secure container 200 is instantiated in the non-debuggable state or a debuggable state. In some implementations, when the "Debug" bit is set to a value of one (1), the corresponding secure container 200 is in the debuggable state to thereby allow read and/or write instructions to inspect and/or modify the contents 202 of the secure container 200. By default, the secure containers 200 of the secure container system 150 may be instantiated in the non-debuggable state, and thus, prevent even the administrator device 110 from inspecting the contents 202 of the secured container 200 without first obtaining an approved break-glass ticket 164 and the container system 150 verifying the approved break-glass ticket 164. Other examples may include the access setting 230 including a performance profiling setting on currently-executing secure containers 200.

The cryptographic field 220b and the public key field 220c may contain information corresponding to the identity of the corresponding secure container 200. In some implementations, the cryptographic field 220b contains a cryptographic hash 320b associated with an instantiation process of the corresponding secure container 200 while the public key field 220c contains a hash of a public key 320c used to verify the corresponding secure container 200. Moreover, the approver field 220d may contain a verification key 330 or an identifier (e.g., hash) of the verification key 330 to verify a digital signature 332 (FIG. 3B) of an approved break-glass ticket 164. In some examples, the approver field 220d contains an approver identifier 320d identifying the break-glass approver 310 responsible for approving the pending break-glass ticket 162 associated with one or more instances of the corresponding secure container 200. The approver field 220d may declare the break-glass approver 310 when the one or more instances of the corresponding secure container 200 instantiate, and in some examples, the hash of the public key 320c contained by the public key field 220c recognizes the identity (e.g., approver identifier 320d) of the break-glass approver 310. Accordingly, as the identity of the break-glass approver 310 may constitute a fundamental part of the identity of the secure container 200, the attestation of each instance of the corresponding secure container 200 may include the approver identifier 320d of the break-glass approver 310.

Figure 3A:
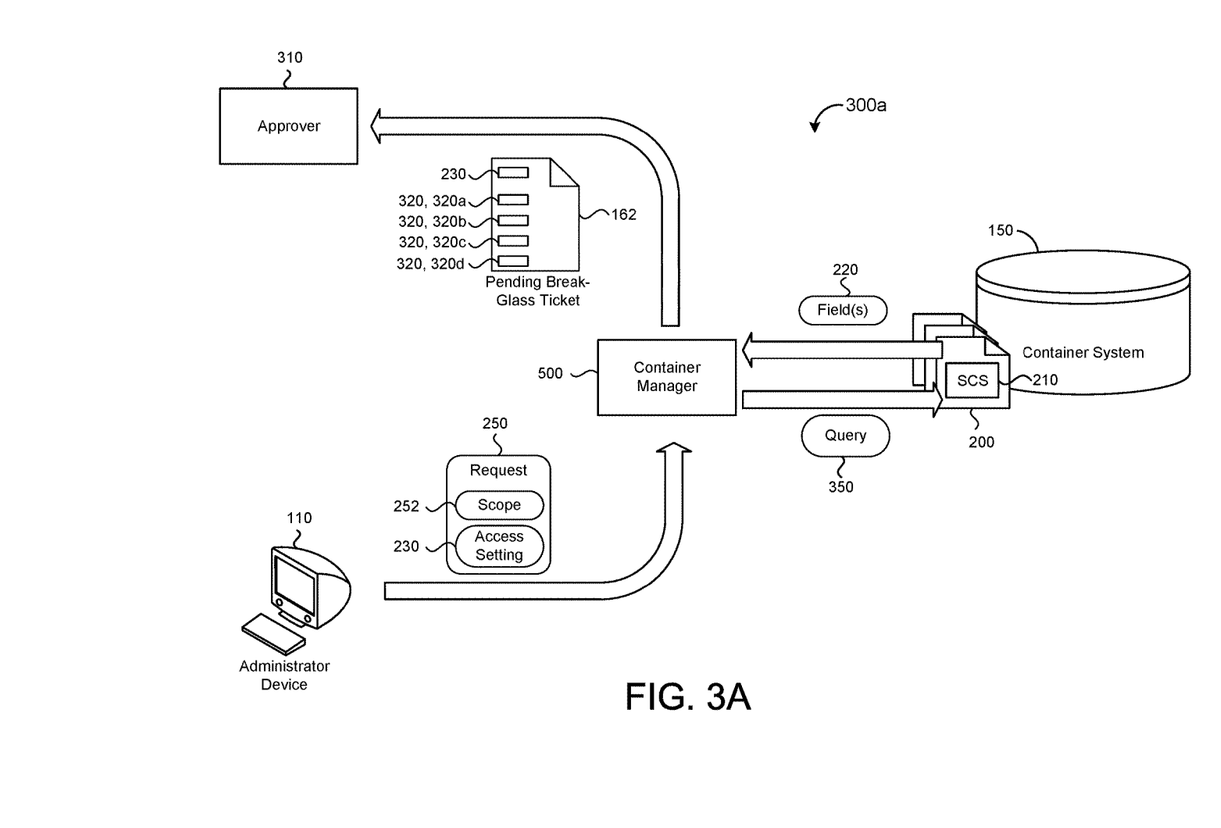
FIGS. 3A and 3B show schematic views of a container manager generating a pending break-glass ticket having a break-glass ticket scope and receiving an approved break-glass ticket from an approver.
Figure 3B:
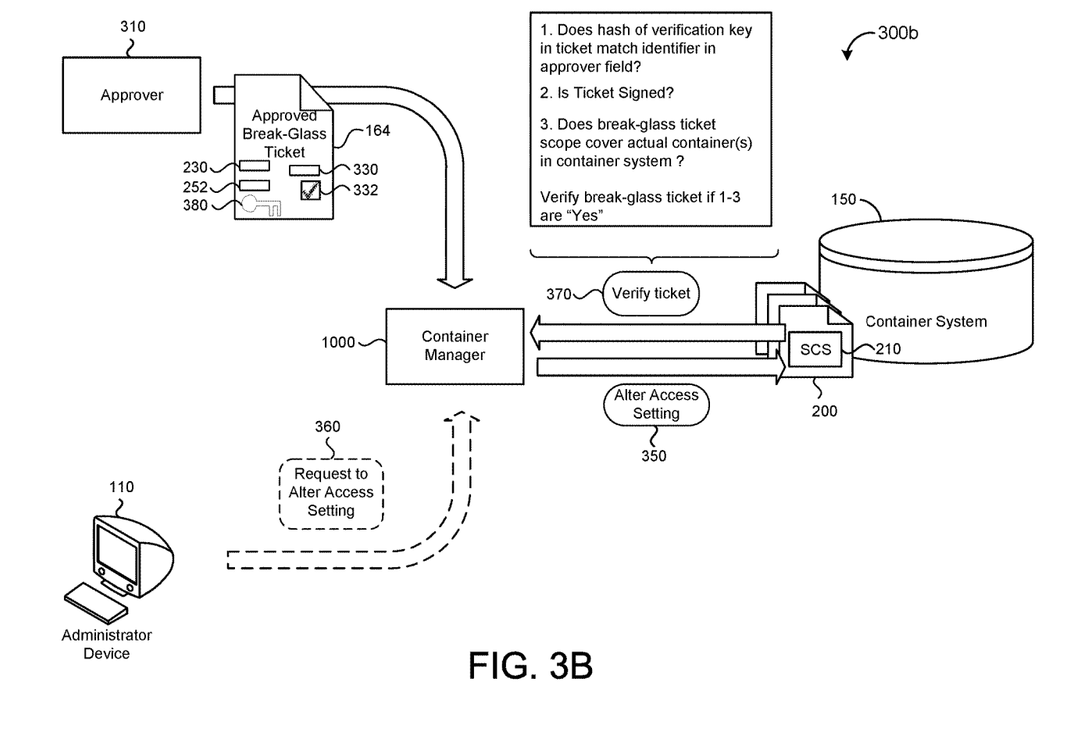

FIGS. 3A and 3B show schematic views 300a, 300b of an example container manager 160 generating the pending break-glass ticket 162 in response to receiving the break-glass ticket request 250 from the administrator device 110 and receiving the approved break-glass ticket 164 from the approver 310. FIGS. 3A and 3B provide a hardware-based implementation that permits the approved break-glass ticket 164 to modify the attributes field 220a within the SCS 210 of a corresponding secure container 200 so that the administrator device 110 is able to debug, or otherwise, inspect an instance or a group of instances of the corresponding secure container 200 of the secure container system 150 executing on the remote system 140 (e.g., cloud environment).

Referring to FIG. 3A, the container manager 160 receives the break-glass ticket request 250 from the administrator device 110 requesting the container manager 160 to generate a pending break-glass ticket 162 for approval by the approver 310. The example shows the break-glass ticket request 250 including the break-glass ticket scope 252 and the access setting 230 of the one or more secured containers 200 identified by the break-glass ticket scope 252 the administrator device 110 wants to alter. In some examples, the container manager 160 sends a query 350 to the SCS 210 of the one or more identified secure containers 200 to pull fields 220 associated with the break-glass ticket scope 252 and obtain container identification information 320 therefrom for inclusion in the pending break-glass ticket 162. As used herein, the container identification information 320 refers to information obtained from the fields 220 necessary to identify the one or more identified secure containers 200 at a granularity specified by the break-glass ticket scope 252. That is to say, the container manager 160 may generate the pending break-glass ticket 162 including the container identification information 320 specified by the break-glass ticket scope 252.

The break-glass ticket scope 252 may define a particular instance of a target secure container 200 of the secure container system 150. Alternatively, the break-glass ticket scope 252 may define a subset of the contents 202 of a corresponding secure container 200. For example, the break-glass ticket scope 252 may define all containers 200 signed with a specific public key 320c. In some implementations, when the break-glass ticket scope 252 defines a specific instance of an identified secure container 200, the container manager 160 queries 350 the SCS 210 of the corresponding secure container 200 to obtain a unique identifier 320a associated with the secure container 200 for inclusion in the pending break-glass ticket 162 by pulling a field 220 of the SCS 210 that stores the unique identifier 320a. In implementations when the break-glass ticket scope 252 defines all secure containers 200 sharing specified settings within each of the attributes field 220a, the cryptographic field 220b, and the public key field 220c, the container manager 160 pulls the associated fields 220 from the SCS 210 of the identified one or more secure containers 200 to obtain the specified access setting 230 to be changed/altered, the cryptographic hash 320b, and the specified public key 320c. The pending break-glass ticket 162 may also include the approver identifier 320d identifying the break-glass approver 310 responsible for approving the pending break-glass ticket 162. Upon generating the pending break-glass ticket 162 including the container identification information 320 specified by the break-glass ticket scope 252, the container manager 160 transmits the pending break-glass ticket 162 to the break-glass approver 310 for approval.

The break-glass approver 310 may check the break-glass ticket scope 252 by analyzing the container identification information 320 upon receiving the pending break-glass ticket 162 and sign an approved break-glass ticket 164 (FIG. 1) when the break-glass ticket scope 252 is acceptable. FIG. 3B shows the container manager 160 receiving an approved break-glass ticket 164 having a digital signature 332 from the break-glass approver 310. The approved break-glass ticket 164 may include the break-glass ticket scope 252, the access setting 230 of the one or more secure containers 200 defined by the break-glass ticket scope to be changed/altered, the digital signature 332, and/or a verification key 330 or an identifier (e.g., hash) of the verification key 330 associated with the approver 310 for verifying the digital signature 332.

In some implementations, the container manager 160 verifies 370 the approved break-glass ticket 164 in response to receiving the approved break-glass ticket 164 from the approver 310 by verifying the digital signature 332 and verifying the break-glass ticket scope 252 as covering actual one or more secure containers 200 of the secure container system 150. For instance, the container manager 160 may verify the digital signature 332 by determining whether the verification key 330 associated with the approver 310 matches the identifier (e.g., hash) of the verification key 330 stored in the approver field 220d of the SCS 210 of each of the one or more identified secure containers 200. In some examples, the approved break-glass ticket 164 includes a cryptographic key 380 for accessing the one or more of the identified one or more secure containers 200. In these examples, the container manager 160 approves the cryptographic key 380 in response to receiving the approved break-glass ticket 164 by comparing the cryptographic key 380 with the cryptographic hash 320b contained in the cryptographic field of the SCS 210 for each identified secure container 200.

The container manager 160 may alter the access setting 230 of the one or more secure containers 200 defined in the break-glass ticket scope 252 when the container manager 160 verifies the approved break-glass ticket 164. Here, the altered access setting 230 allows debugging of the respective contents 202 of the one or more secure containers 200 executing the corresponding secure execution environments. The secure containers 200 may continue to execute uninterrupted during altering of the access setting 230. In some examples, only control hardware associated with the container manager 160 executes the debugging of the respective contents of the one or more secure containers 200. In some implementations, the altering of the access setting 230 of the one or more secure containers defined in the break-glass ticket scope 252 includes altering a cryptographic identify of the one or more containers defined in the break-glass ticket scope 252. In some examples, the administrator device 110 transmits a request to alter the access setting 360 to the container manager 160 when the container manager 160 receives the approved break-glass ticket 164 from the approver 310.

In some implementations, the approved break-glass ticket 164 is bound by a predetermined time period for which the approved break-glass ticket 164 is valid. After receiving the approved break-glass ticket 164, the container manager 160 may reject the approved break-glass ticket 164 if a current time is outside the predetermined time period specified by the approved break-glass ticket 164. Accordingly, binding the validity of the approved break-glass ticket 164 by the predetermined time period prevents the ability to access the secure container(s) 200 at any and all times in the future.

Figure 4A:
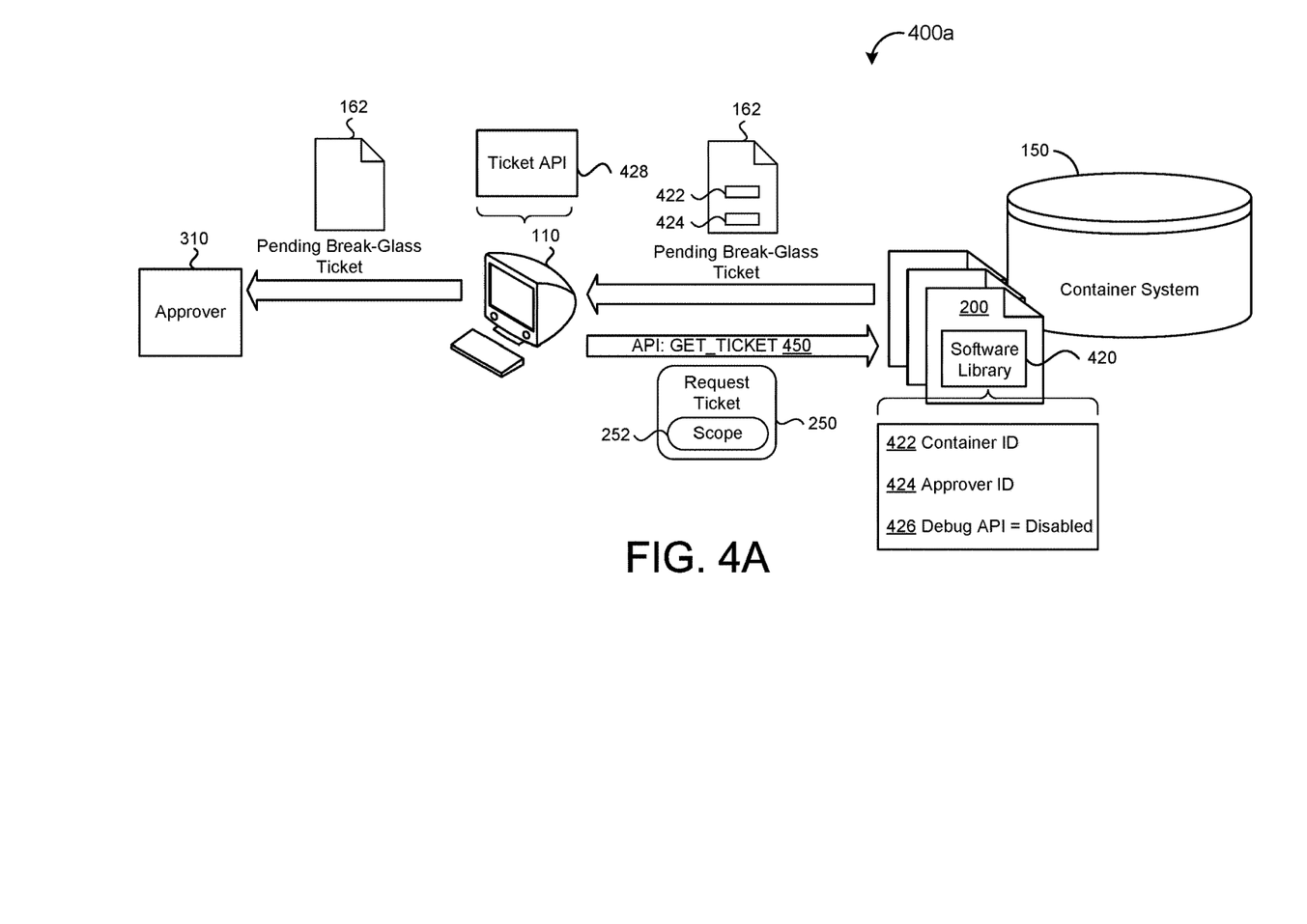
FIGS. 4A-4C show schematic views of an example software library within the secure containers generating a pending break-glass ticket having a break-glass ticket scope and receiving an approved break-glass ticket from an approver.
Figure 4B:
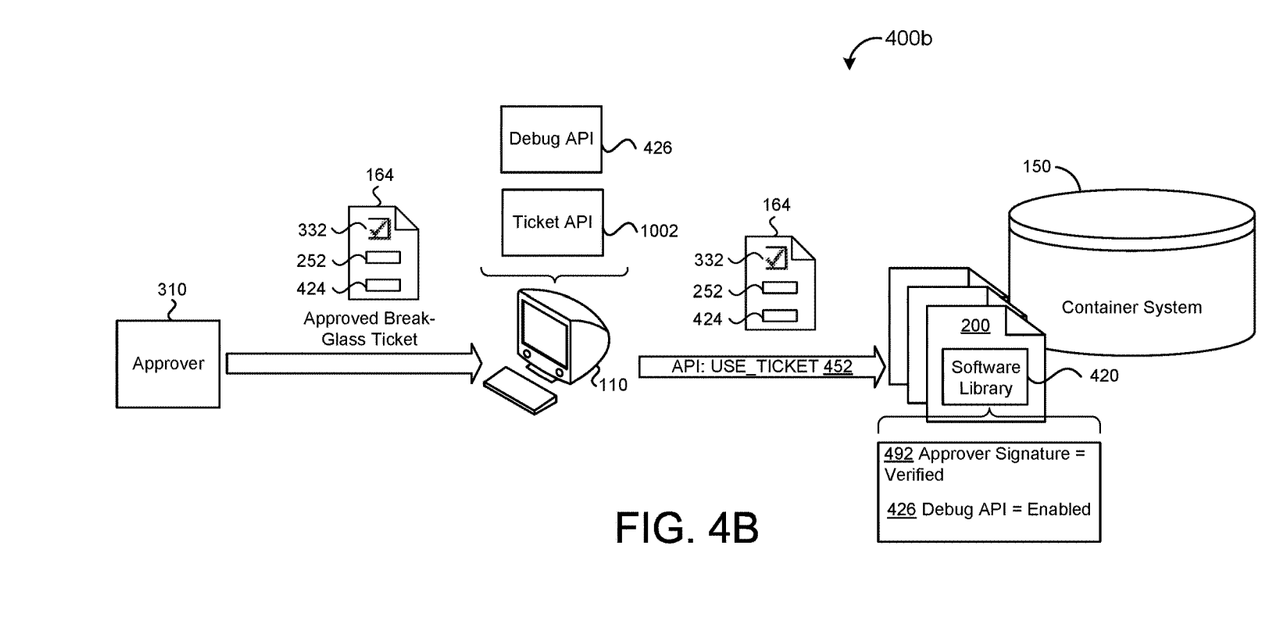
Figure 4C:
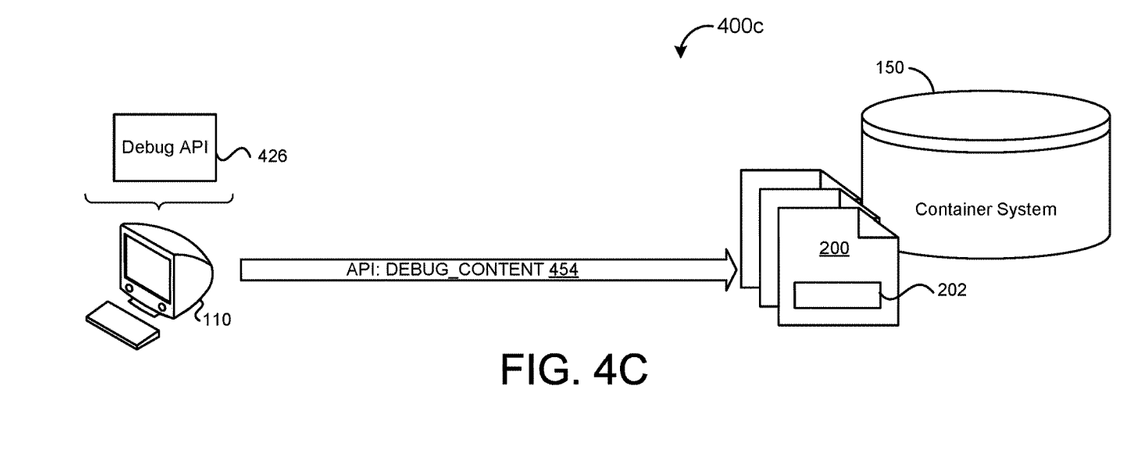

FIGS. 4A-4C show schematic views 400a, 400b, 400c of example secure containers 200 of the secure container system 150 executing a software library 420 linked to the respective contents 202 of the secure containers 200 executing the corresponding secure execution environments. While the examples of FIGS. 3A and 3B provide hardware-based examples to alter the access setting 230 of one or more secure containers 200 defined in a break-glass ticket scope 252, FIGS. 4A and 4B provide a software-based implementation that permits the approved break-glass ticket 164 to enable debug functionality of one or more secure containers 200 defined in the break-glass ticket scope 252 by providing access to a debug application programming interface (API) 426 within the one or more secure containers 200.

Referring to FIG. 4A, in some implementations, the software library 420 executing within the secure containers 200 receives a break-glass ticket request 250 having the break-glass ticket scope 252 from the administrator device 110. The administrator device 110 may execute a ticket API 428 to transmit the request 250 using an "API: GET_TICKET" 450 call directed toward the software library 420. Here, the software library 420 may contain a list of container identifiers 422 associated with the secure containers 200 of the secure container system 150, approver identifiers 424 associated with the break-glass approver 310 responsible for approving pending break-glass tickets 162, and a setting of the debug API 426 indicating whether or not the debug API 426 is enabled or disabled. While the debug API 426 is disabled, debugging of the respective contents 202 of the secure containers 200 is not permitted. In some implementations, the secure containers 200 are instantiated in a non-debuggable state and the setting of the debug API 426 is disabled by default. In some implementations, the software library 420 reports any API calls or requests from outside of the software library 420 that attempt to debug the secure containers 200 when the debug API 426 is disabled. For example, FIG. 1 shows the secure container system 150 transmitting a notification 166 to the client device 120 that owns the content 202 protected by a secure container 200 when an API call attempts to debug the secure containers 200 when the debug API 426 is disabled.

The software library 420 may generate the pending break-glass ticket 162 including each container identifier 422 and the approver identifier 424 associated with the one or more secure containers 200 defined by the break-glass ticket scope 252. The administrator device 110 may receive the pending break-glass ticket 162 from the software library 420 and provide the pending break-glass ticket 162 to the approver 310 for approval. In some examples, the software library 420 transmits the pending break-glass ticket 162 directly to the approver 310.

The break-glass approver 310 checks the break-glass ticket scope 252 and signs an approved break-glass ticket 164 when the break-glass ticket scope 252 is acceptable. FIG. 4B shows the approved break-glass ticket 164 having a digital signature 332, the approver identifier 424, and the break-glass ticket scope 252. In some implementations, the software library 420 receives the approved break-glass ticket 164 via an "API: USE_TICKET" 452 call from the administrator device 110. In some configurations, the software library receives the approved break-glass ticket 164 via the API: USE_TICKET 452 call from the approver 310.

In some implementations, the software library 420 verifies the approved break-glass ticket 164 in response to receiving the approved break-glass ticket 164 by verifying the digital signature 332 and verifying the break-glass ticket scope 252 as covering actual one or more secure containers 200 of the secure container system 150. For instance, the software library 420 may verify the digital signature 332 by determining whether the approver identifier 424 matches the approver identifier 424 stored in the software library 420. Upon verifying the approved break-glass ticket 164, the software library 420 updates an approver signature setting 492 within the software library 420 and changes the setting of the debug API 426 from disabled to enabled. Referring to FIG. 4C, in some implementations, enabling the debug API 426 permits the administrator device 110 to execute the debug API 426 to allow debugging of the respective contents 202 of the one or more secure containers 200 executing the corresponding secure execution environments. Using the debug API 426, the administrator device 110 may directly debug the contents 202 by transmitting an "API: DEBUG_CONTENT" 454 call to the software library 420.

In some implementations, the approved break-glass ticket 164 is bound by a predetermined time period for which the approved break-glass ticket 164 is valid. After receiving the approved break-glass ticket 164, the software library 420 may reject the approved break-glass ticket 164 when a current time is outside the predetermined time period specified by the approved break-glass ticket 164. If the software library 420 rejects the approved break-glass ticket 164, the software library 420 maintains the setting of the debug API 426 as disabled. The secure containers 200 may continue to execute uninterrupted during debugging of the respective contents 202 of the secured containers 200. While the examples of FIG. 4A-4C relate to allowing debugging functionality, the examples of FIG. 4A-4C are equally applicable to allowing performance profiling functionality of currently-executing secure containers 200 through enabling a corresponding API similar to the debugging API 426.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

Figure 5:
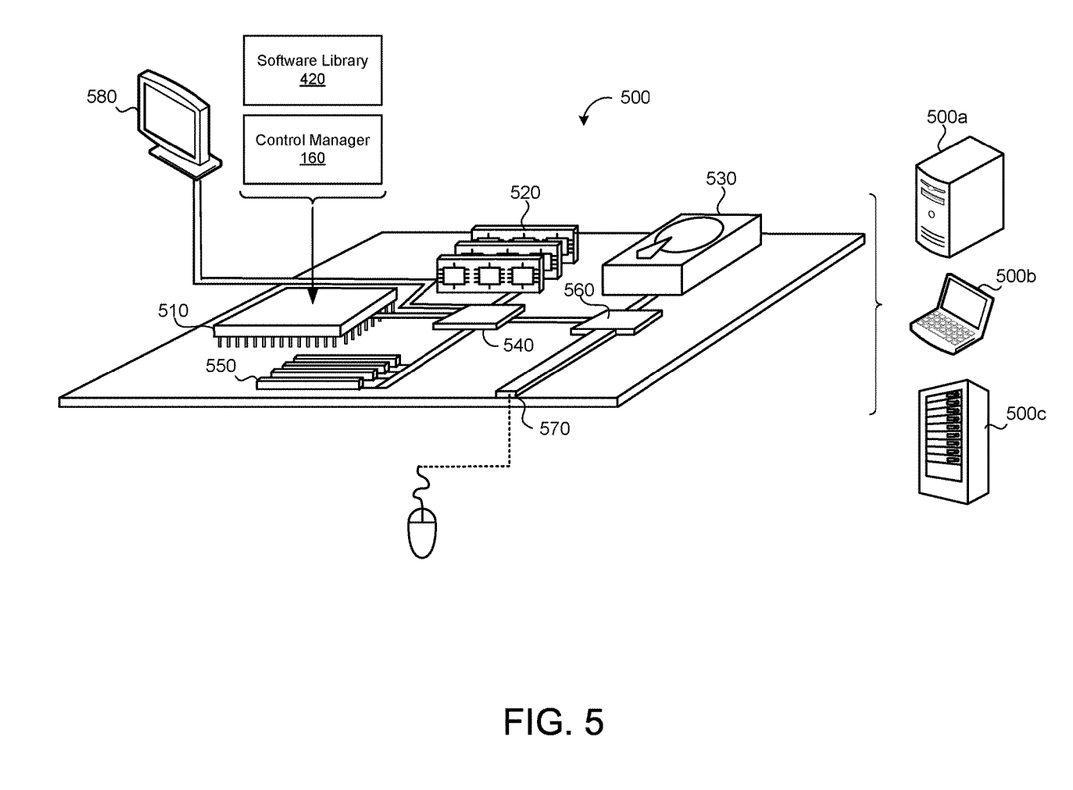
FIG. 5 is a schematic view of an example computing device executing a container manager.

FIG. 5 is schematic view of an example computing device 500 that may be used to implement the systems and methods described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510, memory 520, a storage device 530, a high-speed interface/controller 540 connecting to the memory 520 and high-speed expansion ports 550, and a low speed interface/controller 560 connecting to low speed bus 570 and storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and low-speed expansion port 570. The low-speed expansion port 570, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500a or multiple times in a group of such servers 500a, as a laptop computer 500b, or as part of a rack server system 500c.

In some implementations, the computing device 500 implementing the container manager 160 or software library 420 is in communication with memory hardware in the memory 520 for implementing the secure container system 150 having secure containers 200 and executing corresponding secure execution environments for respective contents 202. The processor 510 executes the container manager 160. For example, the container manager may generate a pending break-glass ticket 162 having a break-glass ticket scope 252 and transmit the pending break-glass ticket 162 to the approver 310 for approval. In some implementations, the container manager 160 receives the approved break-glass ticket 164 and alters the access setting 230 of the one or more secure containers 200 defined in the break-glass ticket scope 252. The access setting 230 allows debugging of the respective contents 202 of the one or more secure containers 200. In some examples, only the container manager 160 (e.g., control hardware) executes the debugging of the respective contents 202 of the one or more secure containers 200. In other examples, the software library 420 provides access to a debugging application programming interface within the one or more secure containers to alter the access setting 230 of the one or more secure containers 200.

Figure 6:
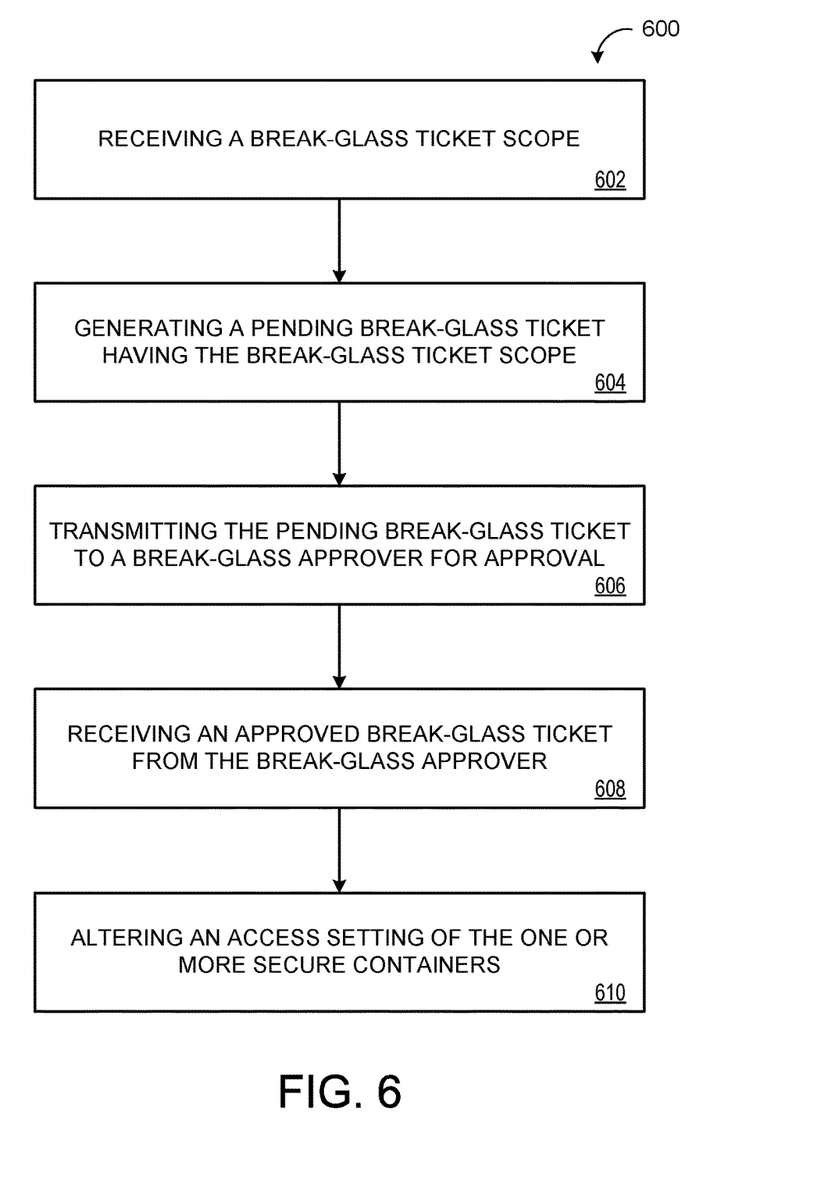
FIG. 6 is a flow chart of an example method for altering an access setting of a secured container.

FIG. 6 is a flowchart of an example method executed on the computing device 500 of FIG. 5 for altering an access setting 230 of one or more secure containers 200. The flowchart starts at operation 602 when the computing device 500 (e.g., data processing hardware) of the secure container system 150 having secure containers 200 receives a break-glass ticket scope 252 identifying one or more secure containers 200 of the secure container system. The secure containers 200 may be instantiated in a non-debuggable state and execute secure execution environments for contents 202 of the corresponding secure containers 200. At operation 604, the computing device 500 generates a pending break-glass ticket 162 having the break-glass ticket scope 252, and at operation 606, transmits the pending break-glass ticket 162 to a break-glass approver 310 for approval. Thereafter, the computing device 500 receives the approved break-glass ticket 164 from the break-glass approver 310 at operation 608.

In response to receiving the approved break-glass ticket 164, at operation 610, the computing device 500 alters the access setting 230 of the one or more secure containers 200 defined in the break-glass ticket scope 252. The altered access setting 230 may allow debugging of the respective contents of the one or more secure containers executing the corresponding secure execution environments. In some examples, the access setting 230 includes a debug setting. The altering of the access setting 230 may alter a cryptographic identify of the one or more secure containers 200 defined in the break-glass ticket scope 252. In other examples, the access setting 230 includes a performance profiling setting on currently-executing secure containers.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A method comprising:
receiving, at data processing hardware of a secure container system having secure containers, a break-glass ticket scope from an administrator device, the break-glass ticket scope using a hash of a unique public key to identify one or more secure containers of the secure container system to allow debugging of contents of the corresponding secure containers by the administrator device, the secure containers instantiated in a non-debuggable state and executing corresponding secure execution environments for the respective contents of the corresponding secure containers, each secure container comprising a hash of a verification key, the hash of the verification key associated with an owner of the secure container, and the non-debuggable state preventing the administrator device from freely inspecting the respective contents of the corresponding secure containers without approval expressly granted from the owner of the respective contents;
generating, at the data processing hardware, a pending break-glass ticket having the break-glass ticket scope;
transmitting the pending break-glass ticket from the data processing hardware to a break-glass approver for approval, the break-glass approver comprising the owner of the respective contents of the corresponding secure containers identified by the hash of the unique public key;
receiving, at the data processing hardware, an approved break-glass ticket from the break-glass approver; and
in response to receiving the approved break-glass ticket, altering, by the data processing hardware, an approver signature setting and altering an access setting of the one or more secure containers defined in the break-glass ticket scope, the altered access setting allowing debugging of the respective contents of the one or more secure containers executing the corresponding secure execution environments.

2. The method of claim 1, wherein the approved break-glass ticket comprises a digital signature.

3. The method of claim 2, further comprising, in response to receiving the approved break-glass ticket:
verifying, by the data processing hardware, the digital signature; and
verifying, by the data processing hardware, the break-glass ticket scope as covering actual one or more secure containers of the secure container system.

4. The method of claim 1, wherein the access setting comprises a debug setting.

5. The method of claim 1, wherein the access setting comprises a performance profiling setting.

6. The method of claim 1, wherein altering the access setting of the one or more secure containers defined in the break-glass ticket scope comprises altering a cryptographic identity of the one or more secure containers defined in the break-glass ticket scope.

7. The method of claim 1, wherein altering the access setting of the one or more secure containers defined in the break-glass ticket scope provides access to a debugging application programming interface within the one or more secure containers.

8. The method of claim 7, wherein access to the debugging application programming interface is disabled until the approved break-glass ticket is verified.

9. The method of claim 1, wherein only the data processing hardware can execute the debugging of the respective contents of the one or more secure containers.

10. The method of claim 1, wherein the contents of the identified one or more secure containers are collectively associated with execution of a software application.

11. The method of claim 1, wherein the approved break-glass ticket comprises a cryptographic key or an identifier of the cryptographic key for accessing one or more of the identified one or more secure containers.

12. The method of claim 11, further comprising, in response to receiving the approved break-glass ticket, verifying, by the data processing hardware, the cryptographic key by comparing the cryptographic key with the identifier of the cryptographic key, the identifier of the cryptographic key comprising a hash of the cryptographic key.

13. The method of claim 1, wherein the approved break-glass ticket is valid for a predetermined time period.

14. The method of claim 13, further comprising, in response to receiving the approved break-glass ticket, rejecting, by the data processing hardware, the approved break-glass ticket when a current time is outside the predetermined time period.

15. The method of claim 1, wherein the pending break-glass ticket comprises one or more unique identifiers each identifying a corresponding one of the one or more secure containers defined the break-glass ticket scope.

16. A system comprising:
data processing hardware of a secure container system having secure containers; and
memory hardware in communication with the data processing hardware, the memory hardware storing instructions that when executed on the data processing hardware cause the data processing hardware to perform operations comprising:
receiving a break-glass ticket scope from an administrator device, the break-glass ticket scope using a hash of a unique public key to identify one or more secure containers of the secure container system to allow debugging of contents of the corresponding secure containers by the administrator device, the secure containers instantiated in a non-debuggable state and executing corresponding secure execution environments for contents of the corresponding secure containers, each secure container comprising a hash of a verification key, the hash of the verification key associated with an owner of the secure container, and the non-debuggable state preventing the administrator device from freely inspecting the respective contents of the corresponding secure containers without approval expressly granted from the owner of the respective contents;
generating a pending break-glass ticket having the break-glass ticket scope;
transmitting the pending break-glass ticket to a break-glass approver for approval, the break-glass approver comprising the owner of the respective contents of the corresponding secure containers identified by the hash of the unique public key;
receiving an approved break-glass ticket from the break-glass approver; and in response to receiving the approved break-glass ticket, altering an approver signature setting and altering an access setting of the one or more secure containers defined in the break-glass ticket scope, the altered access setting allowing debugging of the respective contents of the one or more secure containers executing the corresponding secure execution environments.

17. The system of claim 16, wherein the approved break-glass ticket comprises a digital signature.

18. The system of claim 17, wherein the operations further comprise, in response to receiving the approved break-glass ticket:
verifying the digital signature; and
verifying the break-glass ticket scope as covering actual one or more secure containers of the secure container system.

19. The system of claim 16, wherein the access setting comprises a debug setting.

20. The system of claim 16, wherein the access setting comprises a performance profiling setting.

21. The system of claim 16, wherein altering the access setting of the one or more secure containers defined in the break-glass ticket scope comprises altering a cryptographic identity of the one or more secure containers defined in the break-glass ticket scope.

22. The system of claim 16, wherein altering the access setting of the one or more secure containers defined in the break-glass ticket scope provides access to a debugging application programming interface within the one or more secure containers.

23. The system of claim 22, wherein access to the debugging application programming interface is disabled until the approved break-glass ticket is verified.

24. The system of claim 16, wherein only the data processing hardware can execute the debugging of the respective contents of the one or more secure containers.

25. The system of claim 16, wherein the contents of the identified one or more secure containers are collectively associated with execution of a software application.

26. The system of claim 16, wherein the approved break-glass ticket comprises a cryptographic key or an identifier of the cryptographic key for accessing one or more of the identified one or more secure containers.

27. The system of claim 26, wherein the operations further comprise, in response to receiving the approved break-glass ticket, verifying the cryptographic key by comparing the cryptographic key with the identifier of the cryptographic key, the identifier of the cryptographic key comprising a hash of the cryptographic key.

28. The system of claim 16, wherein the approved break-glass ticket is valid for a predetermined time period.

29. The system of claim 28, wherein the operations further comprise, in response to receiving the approved break-glass ticket, rejecting the approved break-glass ticket when a current time is outside the predetermined time period.

30. The system of claim 16, the pending break-glass ticket comprises one or more unique identifiers each identifying a corresponding one of the one or more secure containers defined the break-glass ticket scope.

* * * * *